United States Patent [19]

Botterill et al.

[11] Patent Number: 5,493,927
[45] Date of Patent: Feb. 27, 1996

[54] GEARBOX SWITCHABLE UNDER LOAD

[75] Inventors: John R. Botterill, Saarbrücken; Karl-Heinz Hülsebusch, Köln, both of Germany

[73] Assignee: GKN Automotive AG, Lohmar, Germany

[21] Appl. No.: 230,980

[22] Filed: Apr. 21, 1994

[30] Foreign Application Priority Data

Apr. 22, 1993 [DE] Germany ............... 43 13 167.0

[51] Int. Cl.$^6$ ............... F16H 3/087; B60K 17/08
[52] U.S. Cl. ............... 74/331; 74/359
[58] Field of Search ............... 74/331, 359, 360

[56] References Cited

U.S. PATENT DOCUMENTS

| 4,635,495 | 1/1987 | White | 74/364 |
| 4,855,913 | 8/1989 | Brekkestran et al. | 364/424.1 |
| 4,960,005 | 10/1990 | Kashiwase | 74/329 |
| 4,998,443 | 3/1991 | Janiszewski | 74/335 |
| 5,031,473 | 7/1991 | Yumoto et al. | 74/359 |
| 5,035,682 | 7/1991 | Nakayama et al. | 475/66 |
| 5,078,249 | 1/1992 | Botterill | 74/337.5 |
| 5,186,065 | 2/1993 | Downs | 74/331 |

FOREIGN PATENT DOCUMENTS

| 0239553 | 9/1990 | European Pat. Off. . |
| 2667671 | 4/1992 | France . |
| 911090 | 4/1954 | Germany . |
| 3546454 | 2/1987 | Germany . |
| 3812327 | 6/1989 | Germany . |
| 4007506 | 10/1991 | Germany . |
| 4116189 | 11/1991 | Germany . |
| 2110324 | 11/1982 | United Kingdom . |
| 2249362 | 9/1991 | United Kingdom . |
| WO8904432 | 5/1989 | WIPO . |

Primary Examiner—Dirk Wright
Attorney, Agent, or Firm—Harness, Dickey & Pierce

[57] ABSTRACT

The invention relates to a gearbox switchable under load, which has an input shaft coupled to at least one further shaft, which extends parallel to the input shaft, via pairs of gearwheels to achieve different gear stages. One gearwheel of each pair of gearwheels is rotatively fixedly connected to one of the two shafts and the other gearwheel of each pair of gearwheels is optionally rotatively fixedly connectable to the other of the two shafts by a respective friction coupling. Also, in the gearbox, the input shaft is rotatively fixedly connected to an engine shaft; mechanism to reverse the direction of rotation is provided in the torque flow from the input shaft to the output pinion; and mechanism for approximately simultaneously loading the friction couplings of the two lowest gear stages is provided and for starting purposes when driving forward and reversing, the torque flow through both friction couplings is maintained, at most, until an identical speed has been reached between the elements of the friction coupling of the lowest gear stage.

8 Claims, 6 Drawing Sheets

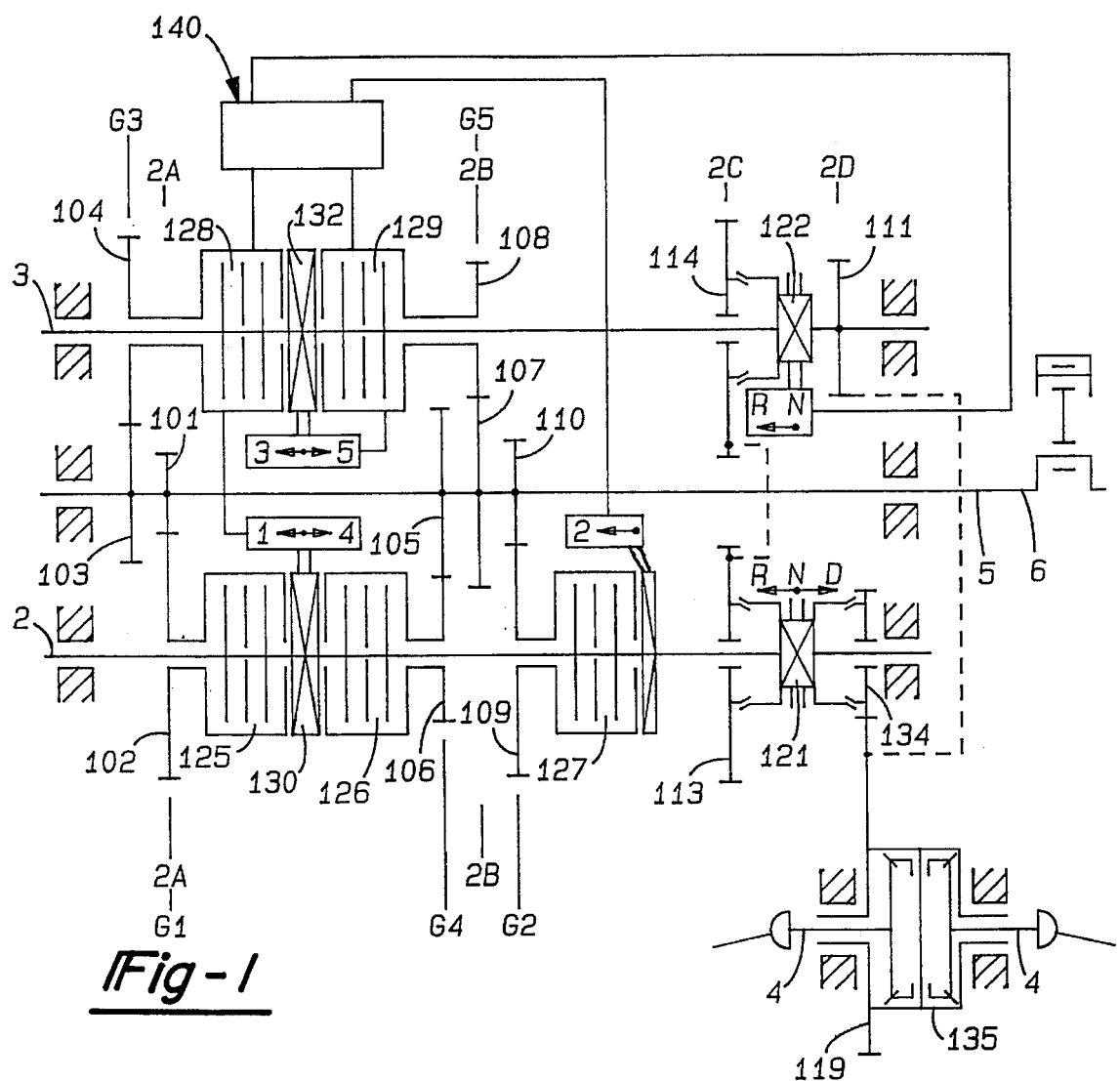
*Fig-1*
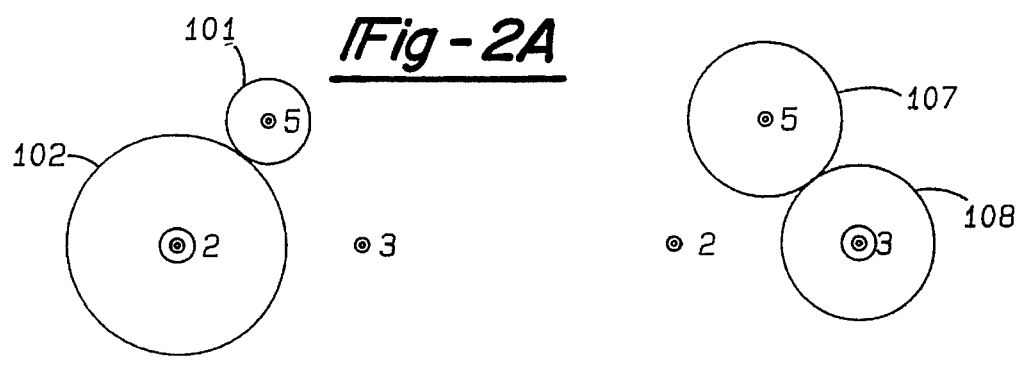
*Fig-2A*  *Fig-2B*

GEARBOX SWITCHABLE UNDER LOAD

BACKGROUND OF THE INVENTION

The invention relates to a gearbox switchable under load. The gear box has an input shaft coupled to at least one further shaft, extending parallel to the input shaft, by pairs of gearwheels to achieve different gear stages. One gearwheel of each pair of gearwheels is rotatively fixedly connected to one of the two shafts. The other gearwheel of each pair of gearwheels is optionally rotatively fixedly connectable to the other of the two shafts by a respective friction coupling.

A gearbox of this type is known from DE 40 07 506 C1 which describes a simply designed gearbox switchable under load. The gearbox is similar in design to manual gearboxes and can be produced at reasonable cost. When starting, the relatively small friction couplings provided for changing gears are subjected to high thermal loads both in the forward and reverse gear. The thermal loads may reach critical values. Because of its length, a gearbox of this type is directly connected to the engine and is less suitable to be arranged transversely in the vehicle.

DE 38 12 327 C2 shows a gearbox switchable under load which is known as a double coupling gearbox. Here, an input shaft is connected to an outer coupling part which accommodates two inner coupling parts connected to separate coaxial shafts. When starting in forward gear, the gearwheels of the two lowest gear stages are engaged. Starting in forward gear is achieved by both coupling parts, and in addition to the switching sleeve of the lowest gear stage, a switching sleeve of the next higher gear stage is actuated at the same time, with the power flow being disconnected in one of the gear stages when the starting speed of the coupling of one of the gear stages has reached the input speed. Contrary thereto, when starting in reverse gear, only one of the coupling halves is loaded. Here, the double coupling is longer than the conventional coupling of a manual gearbox. Because of its design, the gearbox is less suitable to be arranged transversely in a vehicle.

DE 35 46 454 A1 refers to a double coupling gearbox whose characteristics are substantially similar to those described in the previous publication. When starting, both coupling parts are actuated, and the two shafts are connected rigidly by a switching sleeve. When reaching the slip-free condition at the coupling part of the lowest gear stage, the switching sleeve has to be disengaged, thereby generating a switching pressure.

From EP 0 239 553 a short gearbox is known with two intermediate shafts, but it is designed as a manual gearbox.

DE 41 16 989 A1 describes a five or six gear gearbox with three shafts. The gearbox has a short length in the axial direction, but, again, it is designed as a manual gearbox.

U.S. Pat. No. 5,031,473 refers to a five gear gearbox which has a short axial length, but which is also suitable for use as an automatic gearbox, but there is no reference to the arrangement of the reverse gear.

U.S. Pat. No. 5,035,682 describes a six or eight gear gearbox with two reverse gears the latter being actuated by one single multi-plate coupling running in oil. The starting operation is effected by a converter after the respective coupling has been engaged.

To the extent that in the case of the gearboxes of the above type, the vehicle starts in the forward gear by means of the couplings of two gear stages. The fact that the load on the coupling when starting in reverse gear may be just as high as in the case of starting in forward gear has not been taken into account. Prior art gearboxes do not provide a solution for this problem.

SUMMARY OF THE INVENTION

It is therefore an object of the invention to provide a gearbox of the initially mentioned type which, on one hand, retains its design and preferably does without a separating coupling arranged between the engine shaft and the input shaft and, on the other hand, permits safe starting in both the forward and reverse gear.

The objective is achieved in every respect. Both when starting in forward gear and when starting in reverse gear, the couplings of the two first gear stages are loaded simultaneously and in a way which excludes thermal overloading. By distributing the pairs of gearwheels onto the two intermediate shafts it is possible to achieve a particularly short design. As described in publications referring to the relevant state of the art, the friction couplings of the individual gear stages may be actuated electro-mechanically, with one axial actuating device alternatively loading the friction couplings of structurally adjoining, non-successive gear stages. However, it is also possible to use prior art individual hydraulic or pneumatic actuating elements to load the friction couplings of the individual gear stages. Within a very short space it is possible to use a five or six gear gearbox for incorporation into a transversely arranged engine/gearbox unit in a vehicle.

If a starting operation is repeated several times, especially on steep slopes, the couplings used need a thermal capacity which, in accordance with the invention is fully made available by the couplings arranged on the input shaft or on one of the intermediate shafts and loaded simultaneously. In consequence, there is no need for an expensive converter which requires a great deal of space.

The operation of starting in reverse gear takes place in the same way as the operation of starting in forward gear by simultaneously loading the friction couplings and teeth of the first and second gear stages. This system merely requires suitable rotation reversing gearwheels which engage one another and are arranged on the two intermediate shafts and which, optionally, are connected to the shafts. When changing from starting in forward gear to starting in reverse gear, it is necessary to change the intermediate shaft from where the output is effected directly.

The invention proposes two basic embodiments in the case of which the operations of starting in forward gear and starting in reverse gear are effected by two approximately simultaneously loaded couplings.

The first embodiment which is illustrated in FIGS. 1 and 2 includes an input shaft which is positioned coaxially relative to and is rotatively fixedly connected to the engine shaft. Also, a number of axially fixed and rotatively fixed driving gearwheels, which corresponds to the number of forward gears, are arranged on the shaft. The respective gearwheels of the pairs of gearwheels to achieve the gear stages with associated friction couplings for gear changing and starting are preferably distributed onto the two intermediate shafts such that the friction couplings of the first and second gear can be controlled separately and are preferably arranged on the same intermediate shaft. The first intermediate shaft also carries a driving rotation reversing gearwheel which engages a second rotation reversing gearwheel arranged on the second intermediate shaft. Each intermediate shaft carries an output pinion which directly engages a differential spur gear of an adjoining differential drive. In the most simple embodiment, a double switching sleeve effects the change in the power flow between forward driving and reversing by establishing a rotatively fixedly connection between the first intermediate shaft and an output pinion or a rotation reversing gearwheel.

A second embodiment which is illustrated in FIGS. 3 and 4 also includes two intermediate shafts which, at a speed similar to that of the engine speed by means of a driving pinion, are each driven by a shorter input shaft rotatively fixedly connected to the engine shaft. The friction couplings of the pairs of gearwheels of the gear stages are preferably arranged on the two intermediate shafts with the couplings for the first and second gear stage preferably mounted on the same intermediate shaft. An output shaft is positioned coaxially relative to the input shaft and establishes a driving connection with the respective output gearwheels of the pairs of gearwheels on the intermediate shafts. One output pinion is positioned on the output shaft to be rotatively and axially fixed and ensures the torque flow to the differential spur gear either directly or by means of an intermediate gearwheel. The second intermediate shaft carries a driving rotation reversing gearwheel which is axially fixed and may be connected to the second intermediate shaft and which engages a corresponding rotation reversing gearwheel on the first intermediate shaft. Suitable switching sleeve assemblies are provided, and forward driving and reversing are effected by engaging one or two sleeves.

In the case of an input shaft rotating at a high speed, the output shaft in the fifth and sixth gear is driven at an even higher speed. For the pinion of the first gear stage, for the coupling housing rotating therewith and for the respective outer plates, this would mean a multiple of the speed of the input shaft. A freewheeling device in the pair of gearwheels in the first gear stage prevents this condition from occurring. However, in the reverse gear, it has to be bridged. In this case, by means of a claw coupling between the gearwheel of the first gear stage on the output shaft and an adjoining gearwheel of a third or higher gear stage, the freewheeling device is secured on the output shaft so as to be axially and rotatively fixed.

The axial displacement of the gearwheel of the first gear stage may be effected by helical gearwheels for the pair of gearwheels of the first gear stage. The rotation of the gearwheel is initiated by the modulated coupling torque of the first gear stage, with the coupling operating against a stationary or almost stationary output shaft.

Alternative means for axially displacing the gearwheel of the first gear stage may be provided in the form of a switching sleeve which is manually operated by a rod or yoke, together with the switching sleeve(s) fox changing from forward driving to reversing and vice versa.

The second function of the freewheeling device in the gearwheel of the first gear stage refers to starting together with the second gear stage. As soon as the slip in the first gear stage reaches zero, the drive is transferred fully to the second gear stage and the freewheeling device rotates freely, thereby eliminating the need for separately controlling the couplings for changing into the second gear.

For cooling the friction coupling plates moistened by oil and for lubricating the bearings, the intermediate shafts are provided with suitable oil bores which are supplied by a pump preferably driven directly by the input shaft.

From the following detailed description taken in conjunction with the accompanying drawings and subjoined claims, other objects and advantages of the present invention will become apparent to those skilled in the art.

BRIEF DESCRIPTION OF THE DRAWINGS

By way of example, several embodiments of the invention will be described below with reference to the drawing wherein:

FIG. 1 is a diagrammatic longitudinal section view through a first embodiment of a five gear gearbox and an engine crankshaft.

FIGS. 2a–d are diagrammatic views of the shafts of the gearbox according to FIG. 1, having fixed and loose gears through sections 2A, 2B, 2C and 2D of FIG. 1.

DETAILED DESCRIPTION OF THE PREFERRED EMBODIMENTS

Figure 2C:
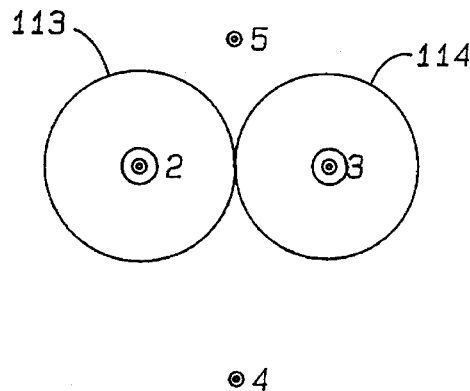
Figure 2D:
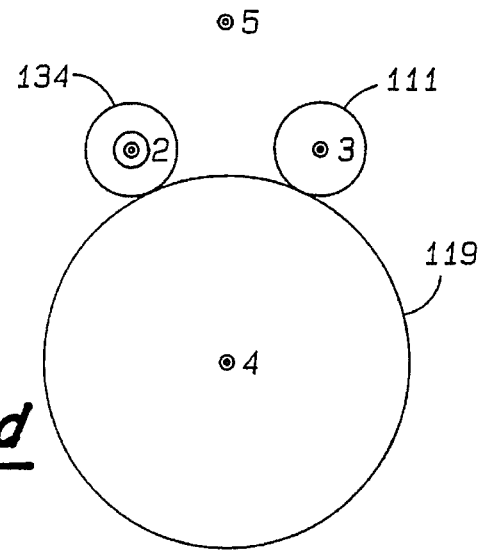

In FIG. 1, a symbolically illustrated engine shaft 6 is rotatively fixedly connected to an input shaft 5 of a gearbox. The connection between the two shafts cannot be disconnected in operation. For example, the connection may be established by a rotationally resilient coupling.

Two intermediate shafts 2 and 3 extend parallel to the input shaft 5. The input shaft 5 carries the driving pinions 101 (G1), 110 (G2), 103 (G3), 105 (G4) and 107 (G5). The symbols in brackets refer to the respective gear stages with which the pinions are the gearwheels 102 (G1), 109 (G2) and 106 (G4) associated with the first intermediate shaft 2, whereas the gearwheels 103 and 107 engage the gearwheels 104 (G3) and 108 associated with the second intermediate shaft 3. The latter gearwheels of the respective gear stages are optionally connectable to, or disconnectable from, their respective shafts by means of friction couplings 125 (G1), 127 (G2), 128 (G3), 126 (G4) and 129 (G5). A joint actuating device 130 optionally actuates the friction couplings 125, 126 of the gear stages G1 and G4, and a joint actuating device 132 actuates the friction couplings 128, 129 of the gear stages G3 and G5. A further actuating device 131 actuates the friction coupling 127 of gear stage G2. Because the friction couplings of each two successive gear stages are each associated with two different actuating devices, it is possible to change gear without interrupting the flow of traction force by actuating two actuating devices approximately simultaneously, one in the sense of closing the coupling one in the sense of opening the coupling. As, on the other hand, the connectable output gears of the first and second gear stages are associated with the same shaft 2, they can both be loaded simultaneously for starting-purposes.

For the purpose of reversing the direction of rotation, for reversing by using the above,described gear stages, each of the shafts 2, 3 carries an axially movable switching sleeve 121, 122, rotatively fixedly connected thereto, and a rotation reversing gear 113, 114, which is freely rotatable on the shaft and connectable thereto by means of the respective switching sleeve. The two rotation reversing gearwheels engage one another directly.

The shaft 2 carries an output pinion 134 which, optionally, as an alternative to the rotation reversing gearwheel 113, may be connected to the shaft 2. The shaft 3 carries a second output pinion 111 which is rotatively fixedly connected thereto. The switching sleeve 122 is provided only for optionally connecting or disconnecting the rotation reversing gearwheel 114 of the shaft 3. The output pinions 134, 111 of the two shafts each directly engage the driving spur gear 119 of the differential 135, which is symbolically connected to two sideshafts 4 leading to the driving wheels.

G1 to G5 refer to the five gear stages 101, 102 (G1), 110, 109 (G2), 103,104 (G3) 105, 106 (G4), 107, 108 (G5). Only gear stages G1 and G2 may be used for forward driving and starting in reverse gear, whereas gear stages G3 to G5 can only be used for forward driving, with special means preventing them from being used for reversing. For G1, the power flow moves from the input shaft 5, via the gearwheel 101, to the gearwheel 102 which, by means of the coupling 125 actuated by the unit 130, drives the intermediate shaft 2. From the intermediate shaft 2, the power flow moves, via the switching sleeve 121, to the output pinion 134 and from there to the spur gear 119. For the gear stage G2, the power flow moves from the input shaft 5, via the gearwheel 110, to the gearwheel 109 which, by means of the coupling 127 actuated by the unit 131, also drives the intermediate shaft 2. From the intermediate shaft 2, the power flow moves via the switching sleeve 121 to the output pinion 134 and to the spur gear 119. For the gear stages G3 to G5, the power flow is effected accordingly.

When the reverse gear is switched in, especially when starting in a reverse gear, the intermediate shaft 2 is driven in the same way by means of 7 the gear stages G1 and G2. The power flow from the intermediate shaft 2 moves, via the switching sleeve 121, to the rotation reversing gear 113 which engages the rotation reversing gear 114 which, in turn, by means of the switching sleeve 122, drives the intermediate shaft 3 from where the power flow, by means of the output pinion 111, moves to the spur gear 119. In gear stages G3 and G5, there is no need for the direction of rotation to be reversed.

FIGS. 2a to 2d show sections through the planes referred to in capital letters in FIG. 1. They indicate the way in which the input shaft 5, the intermediate shafts 2 and 3 and the sideshafts 4 of the differential are positioned relative to one another. The circles indicate the rotatability of a gearwheel on a shaft, whereas a point refers to a pinion firmly connected to a shaft.

When driving forward in the first gear stage, the pairs of gearwheels shown in FIGS. 2a (101, 102) and 2d are included in the power flow. When reversing in the first gear stage, the pairs of gearwheels shown in FIGS. 2a (101, 102), 2c and 2d are included in the power flow. The sequence of the illustrations as given above corresponds to the sequence of the gearwheels in the power flow.

Figure 3:
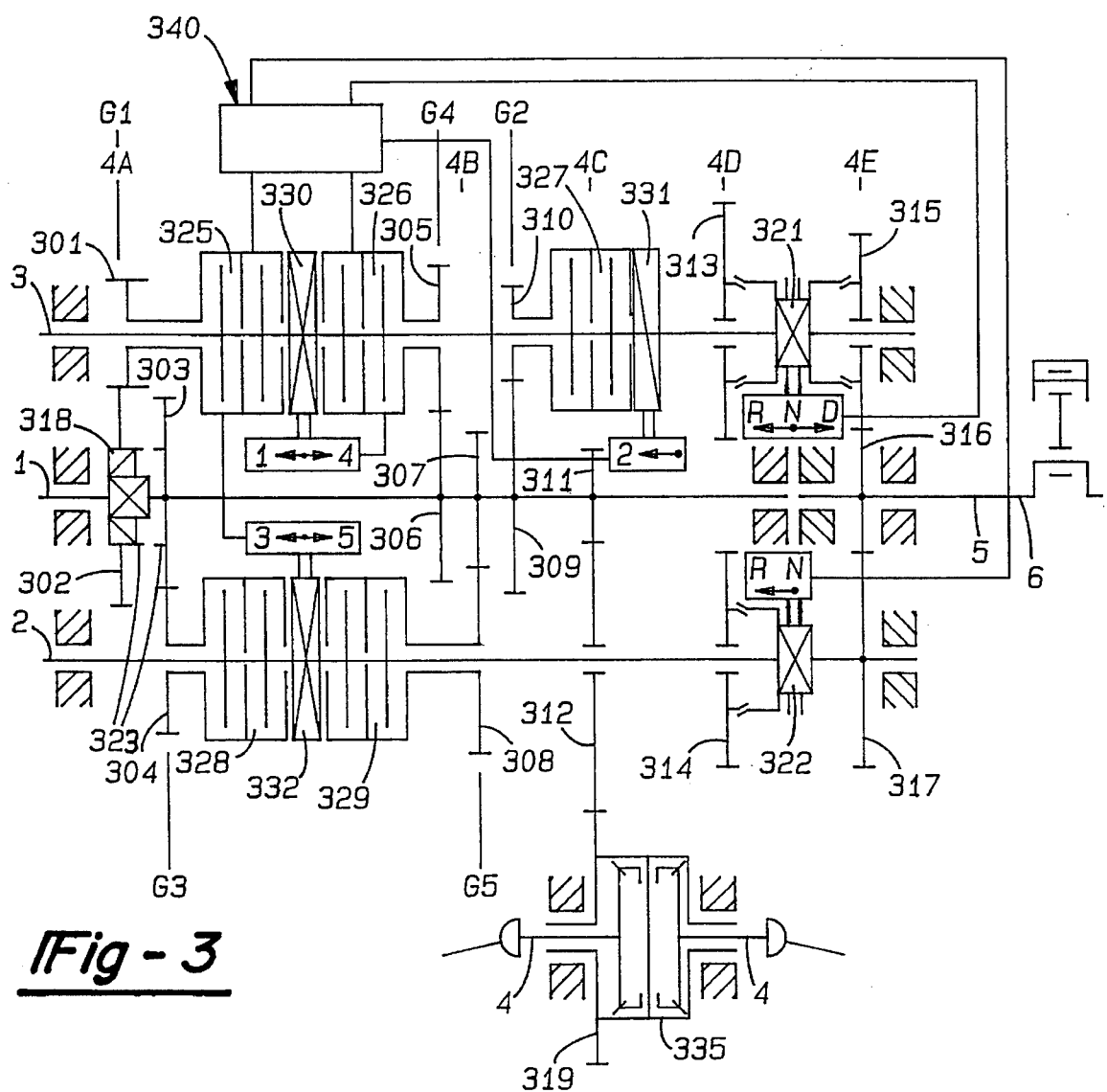
FIG. 3 is a diagrammatic longitudinal section view through a second embodiment of a five gear gearbox and an engine crankshaft, having intermediate shafts rotating at a high speed.

In FIG. 3, a symbolically illustrated engine shaft 6 is again rotatively fixedly connected to the input shaft 5 of the gearbox. The connection between the two shafts may again be effected by a rotationally resilient coupling (not illustrated) which cannot be disconnected in operation. Two intermediate shafts 2, 3 are arranged so as to extend parallel to the input shaft. An output shaft 1 extends coaxially relative to the input shaft 5 and may optionally be connected to the intermediate shafts 2, 3 in a way described below. The intermediate shafts 2, 3 carry driving pinions 317, 315 which permanently engage a driving pinion 316 of the input shaft 5. The input pinion 317 of the intermediate shaft 2 is rotatively fixedly arranged thereon. The driving pinion 315 of the intermediate shaft 3 is optionally connectable thereto or disconnectable therefrom.

The output shaft 1 carries gearwheels 302 (G1), 309 (G2), 303 (G3), 306 (G4) and 307 (G5). The symbols in brackets refer to the respective gear stages with which the gearwheels are associated. The gearwheels are driven by the driving gearwheels 301 (G1), 310 (G2), 304 (G3), 305 (G4) and 308 (G5) arranged on the intermediate shafts. The gearwheels are optionally connectable to or disconnectable from their respective shafts by means of associated friction couplings 325 (G1), 327 (G2), 328 (G3), 326 (G4) and 329 (G5). The couplings 325, 326 are provided with a joint actuating assembly 303 capable of alternatively loading the couplings. The couplings 328, 329 are provided with a joint actuating device 332 capable of alternatively loading the couplings, and the friction coupling 327 is provided with its own actuating device 331.

The gearwheel 302 is connected to the output shaft 1 by means of a freewheeling device 318. When forward starting in forward gear while simultaneously engaging the gear stages G1 and G2, the freewheeling device will open when there is no longer any slip at the friction coupling 125 of gear stage G1 and when the driving power is passed on to gear stage G2 where there is still slip at the friction coupling 127. To ensure that gear stage G1 does not become ineffective when starting in the reverse gear, the freewheeling unit has to be bridged. By means of a bridging coupling 323, it is connected to the adjoining output gearwheel 303 which is rigidly connected to the output shaft 1 and which, by means of the bridging coupling 323, is included in the power flow.

The intermediate shaft 2 carries a freely rotating rotation reversing gearwheel 314 which may be connected to the shaft 2 by means of a switching sleeve 322. The intermediate shaft 3 carries a rotation reversing gearwheel 313 which may be connected to the shaft 3 by means of switching sleeve 321. As an alternative to the rotation reversing gear, the switching sleeve 321 may connect the driving pinion 315 to the shaft 3 or it may disconnect it therefrom. The output shaft 1 carries an output pinion 311 which drives the driving spur gear 319 of a differential carrier 335 by means of an intermediate gear 312, which is not necessarily, but preferably supported on the intermediate shaft 2. Again, the Figure indicates sideshafts 4 leading to the driving wheels.

As far as gear stage 1 is concerned, the power flow, without simultaneously loading the second gear stage G2, moves from the input shaft 5, via the driving gearwheel 316, to the driving gearwheel 315 and the switching sleeve 321 to the intermediate shaft 3. The gearwheel 301 is driven by means of the coupling 325 actuated by the unit 330. The power flow then moves via the gearwheel 302 and the freewheeling unit 318 to the output shaft 1 and the output pinion 311. When reversing, the driving pinion 315 of the shaft 3 is disconnected and instead, the rotation reversing gear 313 is connected. Equally, the rotation reversing gear 314 is connected on the intermediate shaft 2 by means of the switching sleeve 322. Now, the input shaft 5, by means of the driving gearwheel 316, drives the driving gearwheel 317 which, by means of the rotation reversing gearwheels 314, 313 secured to their respective shafts, drives the intermediate shaft 3, with the direction of rotation being reversed. The remaining part of the power flow remains unchanged.

FIGS. 4a to 4e show the planes indicated by capital letters in FIG. 3. They show the way in which the output shaft 1, the intermediate shafts 2 and 3 and the axle shafts or side shafts 4 are positioned relative to one another. Furthermore the Figures illustrate the gearwheels in their respective planes. The circle symbolizes gearwheels rotatable on their respective shafts, and a point refers to gearwheels firmly connected to their respective shafts. The freewheeling device 318 of the gearwheel 302 is also shown.

Figure 4A:
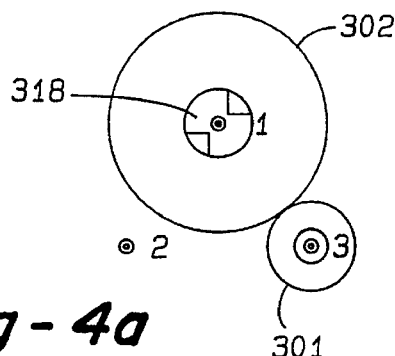
FIGS. 4a–e are diagrammatic views of the shafts of the gearbox according to FIG. 3, having fixed and loose gears according to sections 4A, 4B, 4C, 4D and 4E of FIG. 3.
Figure 4B:
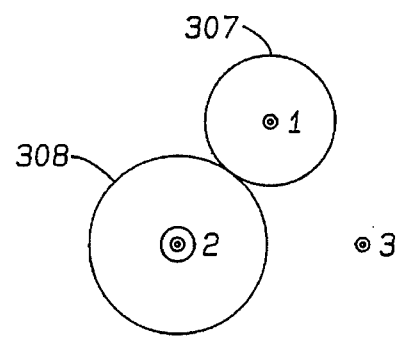
Figure 4C:
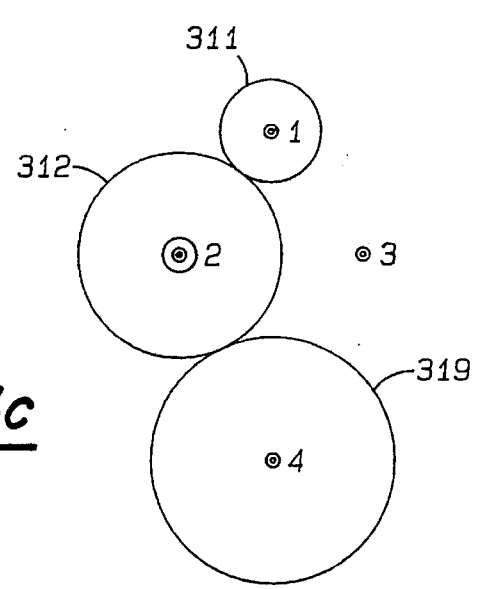
Figure 4D:
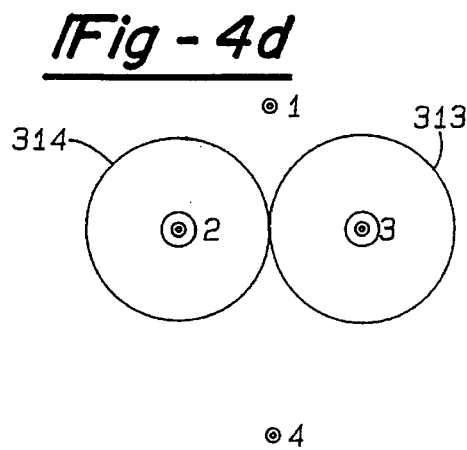
Figure 4E:
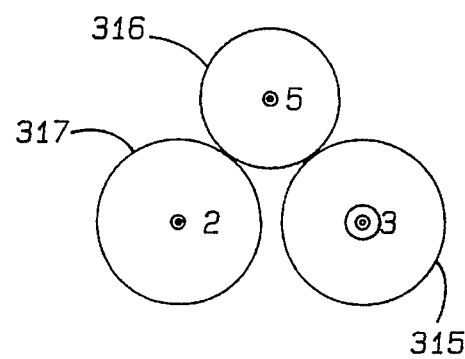

When driving forward in the first gear stage, the power flow moves by means of the pairs of gearwheels according to FIGS. 4e (316, 315), 4a and 4c in the sequence. When reversing in the first gear stage, the power flow moves by means of the pairs of gearwheels according to FIGS. 4e (316, 315), 4a, 4d and 4c in the sequence. The final output drive from the gearwheel 311 to the spur gear 319 with the intermediate gear 312 is greatly facilitated by the assembly as illustrated in FIG. 4c. The gearwheel 312 is supported directly on the shaft 2, which means that the choice of shaft distances 1-2, 1-3 and 2-3 is limited, but the position of the shafts still meets the respective requirements.

Figure 5A:
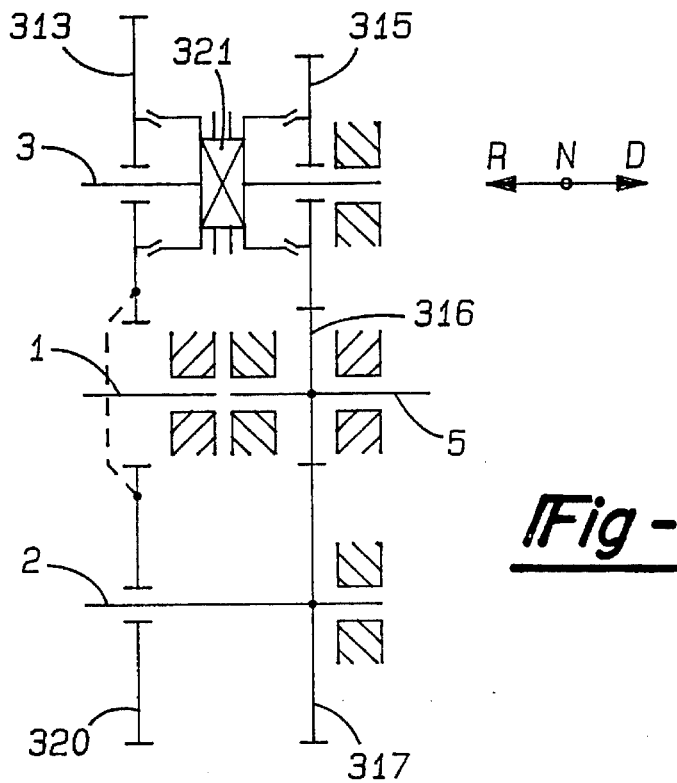
FIGS. 5a and 5b diagrammatic views of two different embodiments of switching sleeves for changing from forward driving to reversing and vice versa, according to FIG. 3.

FIG. 5a shows the details regarding the reversal of the direction of rotation and the simplest way of arranging the gear stages for forward driving and reversing. The rotation reversing gearwheel 320 is rotatively fixedly and non-disconnectably connected to the shaft 2 and therefore constantly rotates during forward driving as well.

Figure 5B:
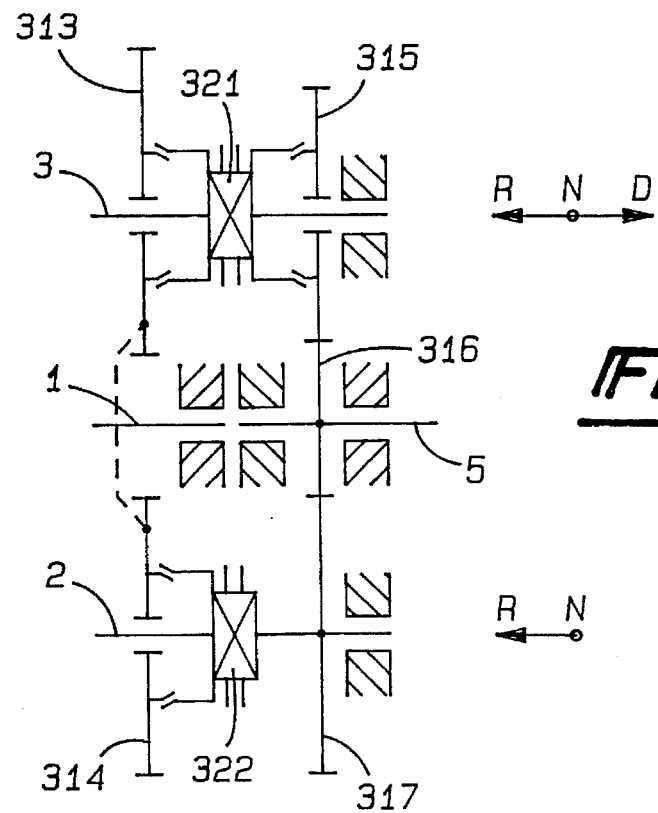

FIG. 5b shows the details regarding the reversal of the direction of rotation according to FIG. 3, with the rotation reversing gearwheel being provided in the form of a loose gearwheel. For the purpose of reversing, the switching sleeves 321 and 322, instead of only sleeve 321 according to FIG. 5a, are engaged when the vehicle is stationary or almost stationary. The arrangement according to FIG. 5b is more advantageous in that it results in quieter running characteristics when driving forward because the rotation reversing gearwheels are not driven in addition, the speed of the bearing between gearwheel 313 and shaft 3 is reduced by half, which is also advantageous.

Figure 6A:
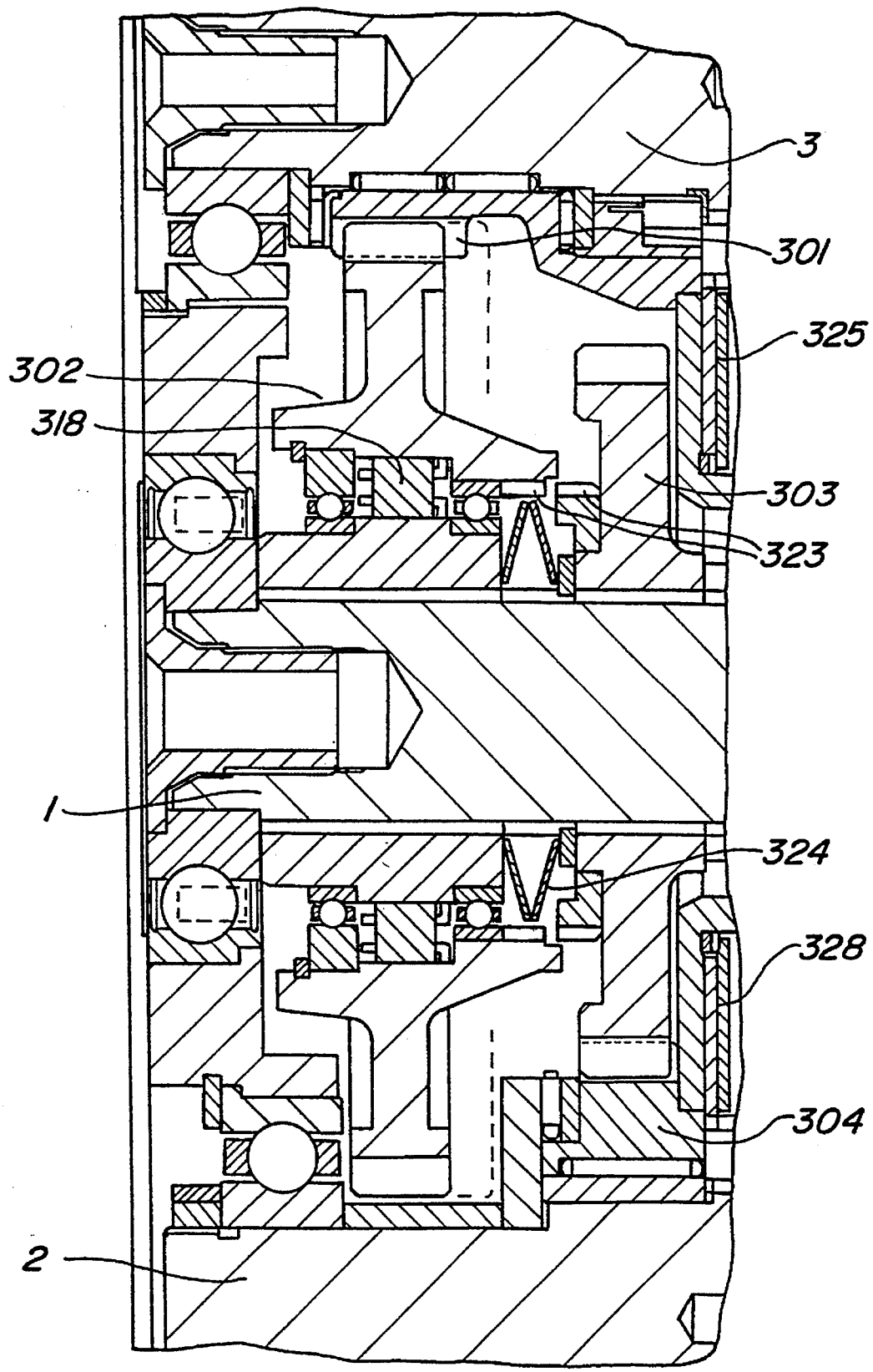
FIGS. 6a and 6b are cross sectional views of two different embodiments of a freewheeling bridging device according to FIG. 3.

FIG. 6a shows the design of the freewheeling device 318 in the gearwheel 302 of the first gear stage G1. It protects the coupling housing and the outer friction plates of the friction coupling 325 from excessive rotational speeds when the gearbox is driven in gear stages G5 and G6 at a high engine speed. When driving forward and reversing under overrun conditions in gear stage G1, the freewheeling unit remains closed. When reversing normally, it is necessary to bridge the freewheeling device.

The freewheeling device is bridged as a result of the rotation of the gearwheel 301 modulated by the coupling 325 and the resulting axial displacement of the gearwheel 302 to the right, the decisive factors being suitable helical teeth of the gearwheels 301, 302 and axial keyway teeth of the hub of the gearwheel 302 with the non-rotating shaft 1. The axial displacement of the gearwheel 302 causes the parts of the bridging coupling to engage, thereby ensuring a non-rotatable connection between the gearwheel 302 and the gearwheel 303 and thus a connection with the shaft 1.

A suitably pretensioned plate spring 324 ensures that when driving forward, the gearwheel 302 cannot axially move to and from when the driving torque changes.

Figure 6B:
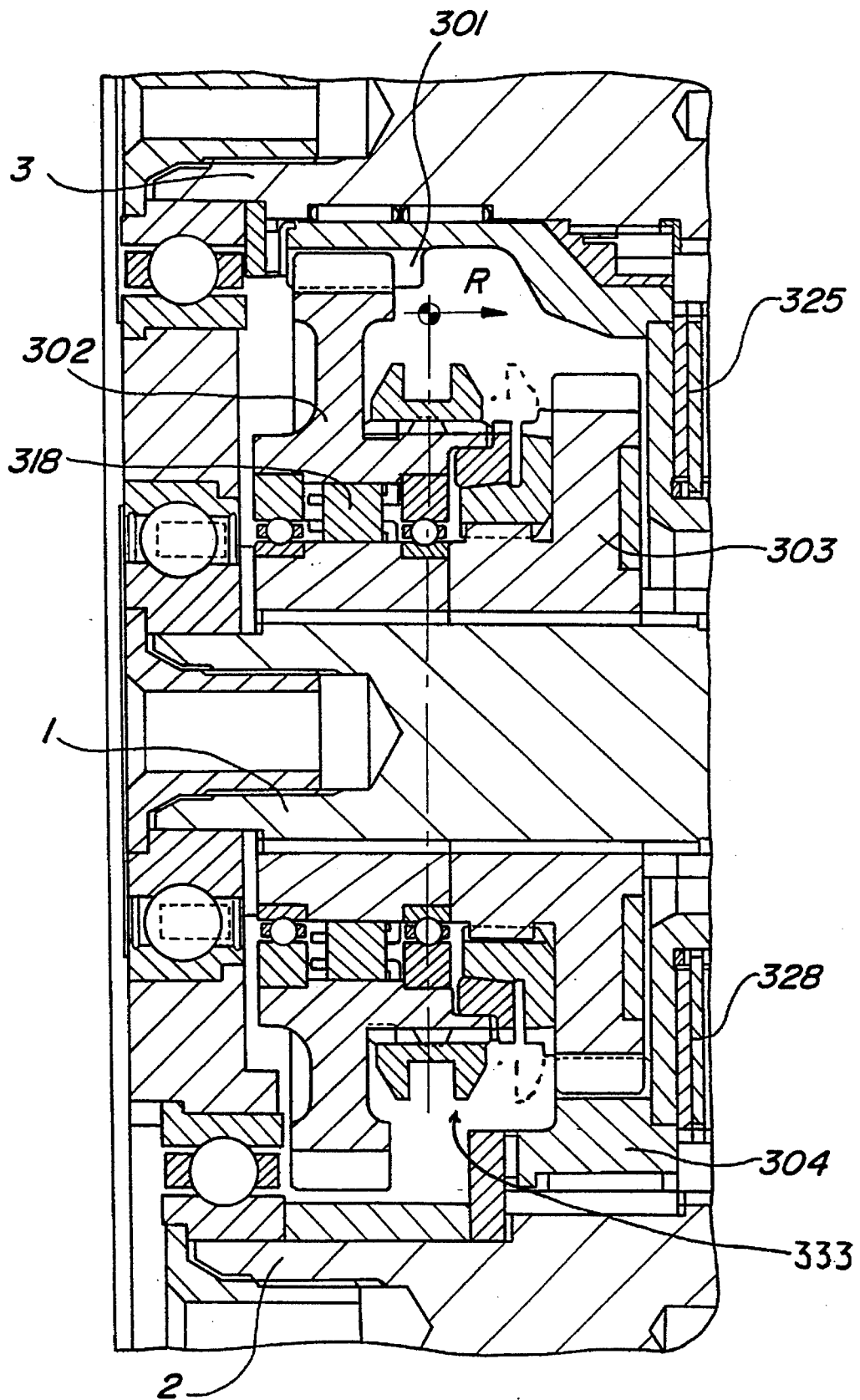

FIG. 6b shows a further embodiment of the bridging coupling for the freewheeling device. A switching sleeve 333 is actuated together with the switching sleeve 321, 322, the disadvantage being that more parts are required for actuating purposes.

After starting in the reverse gear, driving in the reverse gear normally takes place in the lowest gear. Shortly before reaching zero slip conditions at the coupling 325, the electronically controlled coupling 327 is engaged, and the power flow is continued only by means of the coupling 325.

When driving forward, the couplings 325, 327 are loaded approximately simultaneously, with load being applied to them until zero slip conditions have been reached at the coupling 325.

After the freewheeling device 318 has been opened, the starting operation is only continued by the coupling 327. However, if driving continues in the lowest gear, the electronically controlled coupling 327 is disengaged.

Finally, FIGS. 1 and 3 show that for the two basic gearbox designs it is also possibly to use a six gear variant. By axially extending the gearbox is possible to accommodate an additional actuating unit 131, 331 on the shaft 3, which is also able to load an additional coupling on the righthand side. The further coupling may effect the drive by means of an additional pair of gearwheels, similar to gear stages G1, G2, G3, G4, and G5, with the power flow moving to the shaft 1. The actuating units 130, 330, 131, 331 and 132, 332 may either be provided in the form of an expanding mechanism acting on both sides according to DE 40 07 506 C, corresponding to U.S. Pat. No. 5,078,249, the specification and drawings of which are herein expressly incorporated by reference, or a conventional hydraulic or pneumatic cylinder piston unit per coupling.

A mechanism for approximately simultaneously loading friction couplings of the two lowest gear driving speed gear stages for commencing torque transmission in a forwarded driving gear and for commencing torque transmission in the reverse driving gear is illustrated and designated with the numeral 140 and 340. As described in publications referring to the relevant state of the art, the friction couplings of the individual gear stages may be actuated electro-mechanically, with one axial actuating device alternatively loading the friction couplings of structurally adjoining non-successive gear stages. However, it is also possible to use prior art individual hydraulic automatic actuating elements to load the friction couplings of the individual gear stages.

While the above detailed description describes the preferred embodiment of the present invention, the invention is susceptible to modification, variation, and alteration without deviating from the scope and fair meaning of the subjoined claims.

We claim:

1. A gearbox switchable under load between a number of different driving speed gear stages comprising:

an input shaft, said input shaft is rotatively fixedly connected to an engine shaft, at least one further shaft coupled with said input shaft and extending parallel to said input shaft;

pairs of gearwheels for, achieving different driving speed gear stages coupled with said shafts, one gearwheel of each pair of gearwheels being rotatively fixedly connected to one of the two shafts and the other gearwheel of each pair of gearwheels being optionally rotatively fixedly connectable to the other of the two shafts by a respective friction coupling;

means for reversing the direction of rotation in the torque flow from the input shaft to an output pinion, said reversing means associated with at least one of said shafts;

means for approximately simultaneously loading friction couplings of two lowest driving speed gear stages for commencing torque transmission in a forward driving gear and for commencing torque transmission in a reverse gear, torque flow through said friction couplings being maintained, at most, until an identical speed has been reached between the elements of the friction coupling of the most lowest driving speed gear stage.

2. A gearbox according to claim 1, wherein at least two further shafts, which extend parallel to the input shaft, are each optionally rotatably connectable to the input shaft and are positioned in the torque flow from the input shaft to the output pinion, for reversing the direction of rotation, the two further shafts include rotation reversing gearwheels which directly engage one another and, by means of at least one coupling, may establish or interrupt the force-locking connection between the two further shafts so that the rotation reversing gearwheels are included in the torque flow from the input shaft to an output pinion.

3. A gearbox according to claim 2, wherein said pairs of gearwheels of the two lowest driving speed gear stages are arranged between the input shaft and a first shaft of the two further shafts.

4. A gearbox according to claim 2, wherein each further shaft carries at least part of the gearwheels of the pairs of gearwheels for achieving the different driving speed gear stages.

5. A gearbox according to claim 2, wherein each further shaft carries one output pinion respectively, at least one of which, by means of a switchable coupling, is optionally fixedly connectable to and disconnectable from its respective shaft.

6. A gearbox according to claim 2, wherein said input shaft includes at least one driving pinion and wherein said further shafts include one input pinion respectively, said driving pinion drives one input pinion on each of the two further shafts respectively, at least one of said input pinions being optionally fixedly connectable to or disconnectable from the respective shaft by means of a switchable coupling, and the gearwheels of the pairs of gearwheels for achieving the different driving speed gear stages are arranged on the further shafts and on an output shaft which is aligned with the input shaft, the output pinion being positioned on the output shaft.

7. A gearbox according to claim 6, wherein one of the two gearwheels of the pair of gearwheels of the most lowest driving speed gear stage includes a freewheeling device.

8. A gearbox according to claim 7, wherein said freewheeling device includes bridging means which come into effect during reversing.

* * * * *